US007191158B2

(12) United States Patent
Ogg et al.

(10) Patent No.: US 7,191,158 B2
(45) Date of Patent: Mar. 13, 2007

(54) SYSTEM AND METHOD FOR PROVIDING COMPUTER-BASED POSTAGE STAMPS

(75) Inventors: Craig L. Ogg, Long Beach, CA (US); Daniel K. Cowles, Irvine, CA (US); Anthony Robert Phoenix, Lakewood, CA (US)

(73) Assignee: Stamps.com, Santa Monica, CA (US)

( * ) Notice: Subject to any disclaimer, the term of this patent is extended or adjusted under 35 U.S.C. 154(b) by 849 days.

(21) Appl. No.: 09/975,532

(22) Filed: Oct. 10, 2001

(65) Prior Publication Data

US 2002/0073039 A1 Jun. 13, 2002

Related U.S. Application Data

(60) Provisional application No. 60/239,424, filed on Oct. 10, 2000.

(51) Int. Cl.
*G06F 17/00* (2006.01)

(52) U.S. Cl. ....................... 705/408; 705/401; 705/402; 705/403; 705/404; 705/405; 705/406; 705/407; 705/409; 705/410; 235/375; 380/51

(58) Field of Classification Search ......... 705/400–410; 380/51; 325/375
See application file for complete search history.

(56) References Cited

U.S. PATENT DOCUMENTS

| | | | | |
|---|---|---|---|---|
| 4,780,828 A | * | 10/1988 | Whisker | 705/404 |
| 5,122,967 A | * | 6/1992 | Gilham | 705/401 |
| 5,408,416 A | * | 4/1995 | Gilham | 705/406 |
| 5,573,277 A | | 11/1996 | Petkovsek | |
| 5,626,286 A | | 5/1997 | Petkovsek | |
| 5,848,401 A | * | 12/1998 | Goldberg et al. | 705/408 |
| 6,108,643 A | * | 8/2000 | Sansone | 705/62 |
| 6,311,214 B1 | * | 10/2001 | Rhoads | 380/255 |
| 6,505,179 B1 | | 1/2003 | Kara | |
| 6,687,684 B1 | * | 2/2004 | Whitehouse et al. | 705/408 |
| 6,701,304 B2 | * | 3/2004 | Leon | 705/401 |
| 6,735,575 B1 | | 5/2004 | Kara | |

FOREIGN PATENT DOCUMENTS

| | | | |
|---|---|---|---|
| GB | 2235413 | A1 | 3/1991 |
| WO | WO 00/49580 | A1 | 8/2000 |

OTHER PUBLICATIONS

"Multicolor Easily Printable Bar Code", IBM Tech. Discl. Bull., vol. 14, No. 3, p. 783(Aug. 1971).*

* cited by examiner

*Primary Examiner*—James A. Reagan
(74) *Attorney, Agent, or Firm*—Christie, Parker & Hale, LLP.

(57) ABSTRACT

The present invention provides a method and apparatus for creating computer-based postage that may be used on any date and with an undetermined addressee includes generating a request to print postage, determining the means for generating the request, determining the master serial number for label stock, tracking the master serial number and printing the postage.

The present invention provides for the creation of computer-based postage that may be used in a manner similar to standard postage issued by the USPS. In a presently preferred embodiment, the intended address of the recipient need not be verified at the time the postage is created. Rather the postage may be used at any time in the future with any recipient.

44 Claims, 10 Drawing Sheets

SYSTEM AND METHOD FOR PROVIDING COMPUTER-BASED POSTAGE STAMPS

CROSS REFERENCE TO RELATED APPLICATIONS

This application claims the benefit of U.S. Provisional Application No. 60/239,424 filed Oct. 10, 2000 and entitled "A SYSTEM AND METHOD FOR PROVIDING COMPUTER BASED POSTAGE STAMPS" the contents of which are hereby incorporated by reference as if set forth in full herein.

BACKGROUND

A significant percentage of the United States Postal Service (USPS) revenue is from metered postage. Metered postage is generated by utilizing postage meters that print a special mark, also known as postal indicia, on mail pieces. Generally, printing postage and any other value bearing item (VBI) can be carried out by using mechanical meters or computer-based systems. Conventionally, a business or other entity will have a meter at its place of business, and will use the meter to print postal indicia on mail pieces or on labels that are then affixed to the mail pieces.

With respect to computer-based postage processing systems, the USPS under the Information-Based Indicia Program (IBIP) has published specifications for IBIP postage meters that identify a special purpose hardware device, known as a Postal Security Device (PSD) that is generally located at a user's site. The PSD, in conjunction with the user's personal computer and printer, functions as the IBIP postage meter. The USPS has published a number of documents describing the PSD specifications, the indicia specifications and other related and relevant information.

Currently, one of the standards required by the USPS is that the address of the intended recipient of a piece of mail be verified by comparing the entered address with a database of valid addresses provided by the USPS. Conventionally, this requires that the sender have the database installed on their local computer and compare the intended destination address with the addresses in the database. Therefore, while conventional computer-based postage systems allows a user to print a postal indicium at home, at the office, or any other desired place for a particular mail piece with an intended recipient, such systems do not allow the printing of postal indicia onto labels or other print media for future use on any mail piece with a presently unidentified recipient.

Therefore, it would be advantageous to provide a system and method for printing postal indicia that does not require address matching or mailing on a particular date, for use on mailpieces in a manner similar to standard stamps.

SUMMARY OF THE INVENTION

The present invention provides for the creation of computer-based postage that may be used in a manner similar to standard postage issued by the USPS. In a presently preferred embodiment, the intended address of the recipient need not be verified at the time the postage is created. Rather the postage may be used at any time in the future with any recipient.

In one aspect of the present invention, a method is provided for printing postage to be used on any date and with any recipient. The method includes providing label stock including a master serial number. A computer system receives from a user the master serial number and a postage request. The computer generates an indicium using the master serial number and the postage request. The computer then prints the postage using the indicium and the label stock.

In another aspect of the invention, the label stock further includes anti-fraud devices. The anti-fraud devices may include micro-printing, watermarks, the use of phosphorescent ink, and color changing ink on the label stock.

In another aspect of the invention, the postage request includes a postage amount, a postage class, and an identification of a Licensing Postage Office.

In another aspect of the invention, the label stock includes a pre-printed serial number. The computer generates an indicium including the pre-printed serial number.

In another aspect of the invention, the master serial number is linked by the computer to a specific postage printing device. Once the master serial number and the specific printing device are linked, generation of the indicium further includes ensuring the master serial number is used with the specific postage printing device In another aspect of the present invention, a method for creating computer-based postage that may be used on any date and with an undetermined addressee includes generating a request to print postage, determining the means for generating the request, determining the master serial number for label stock, tracking the master serial number and printing the postage.

BRIEF DESCRIPTION OF THE DRAWINGS

These and other features, aspects, and advantages of the present invention will become better understood with regard to the following description, appended claims, and accompanying drawings where:

DETAILED DESCRIPTION

An exemplary embodiment of the present invention enables computer-based postage systems to print postal indicia (computer-based postage stamps) that may be mailed on any current or future date, to any recipient. An example of a computer-based postage system is a software-based, on-line postage system described in U.S. patent application Ser. No. 09/163,993 filed on Sep. 29, 1998, by Mohan Ananda, entitled "On Line Postage System", the contents of which are hereby incorporated by reference as if set forth in full. The on-line postage system software comprises user code or client software that resides on a client system and controller code that resides on a server system. An exemplary on-line postage system may comprise a user system electronically connected to a server system, which in turn is connected to a USPS system. The server system is preferably capable of communicating with one or more client systems simultaneously.

In operation, a licensed and registered client of the on-line postage system sends a request for authorization to print a desired amount of postage. A postal security device (PSD) server determines whether the client's account balance is sufficient to cover the requested amount of postage, and if so, communicates an authorization to the client system. The client system then sends image information for printing a postal indicium for the granted amount to a printer so that the postal indicium is printed on the print media, such as for example a label. Once the postage information is printed on an individual label it may be subsequently placed on an individual mail piece with a recipient of the users choosing and mailed and processed by the USPS.

In one embodiment, the PSD package preferably includes ascending and descending registers (the ascending register "AR" records the amount of postage that is dispensed or printed on each transaction and the descending register "DR" records the value or amount of postage that may be dispensed and decreases from an original or charged amount as postage is printed). A preferred PSD may further include a device ID, indicia key certificate serial number, licensing ZIP code, key token for the indicia signing key, date and time of last transaction, the last challenge received from the client, the operational state of the PSD, expiration dates for keys, the passphrase repetition list and the like.

Figure 1:
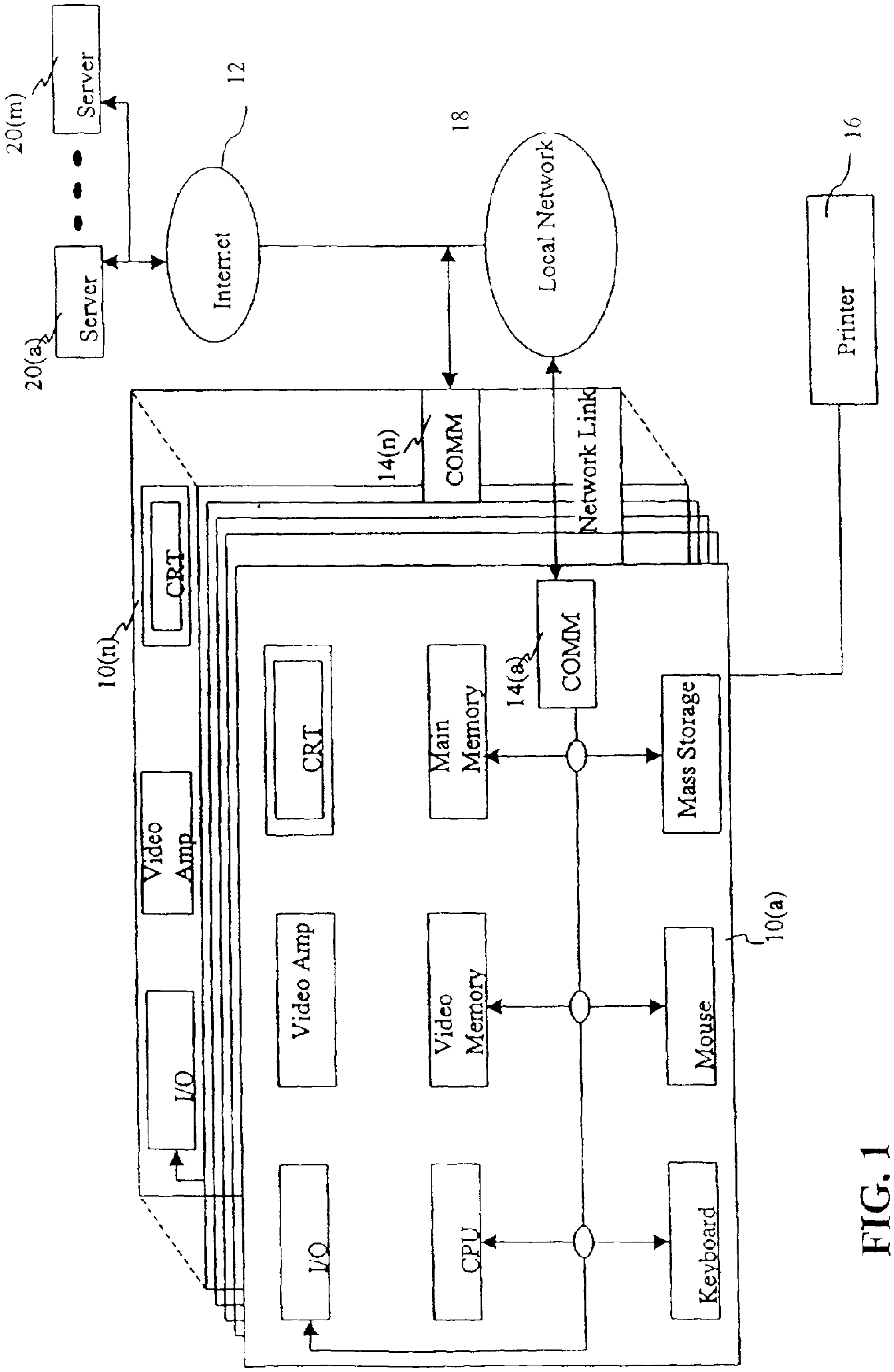
FIG. 1 is a block diagram of an Internet client/server environment used by an on-line postage system in one embodiment of the present invention.

FIG. 1 shows a block diagram of an exemplary client/server environment used by an on-line postage system in accordance with one embodiment of the present invention. Clients 10*a*–10*n* and server 20 engage in two-way communication over a suitable communication network 12. In one embodiment, communication network 12 comprises the Internet. It will be understood by those skilled in the art that the communication network may take many different forms, such as a local area network (LAN), wide area network (WAN), wired telephone network, wireless network, or any other network that supports data communication between respective entities.

The clients 10*a*–10*n* may take many different forms, and in one illustrative embodiment comprise personal computers and printer, with the personal computers being linked to a PSD. Alternatively, the clients 10*a*–10*n* may comprise computers or any other device that has processing capabilities and that may engage in communication over communication network 12. Clients 10*a*–10*n* may be connected to the communication network 12 through communication links 14*a*–14*n*. In addition, each client preferably has access to a printer such as printer 16. Optionally, a local network 18 may serve as the connection between some of the clients, such as the PC 10*a* and the Internet 12. Servers 20*a*–20*m* are also connected to the Internet 12 through respective communication links.

Figure 2:
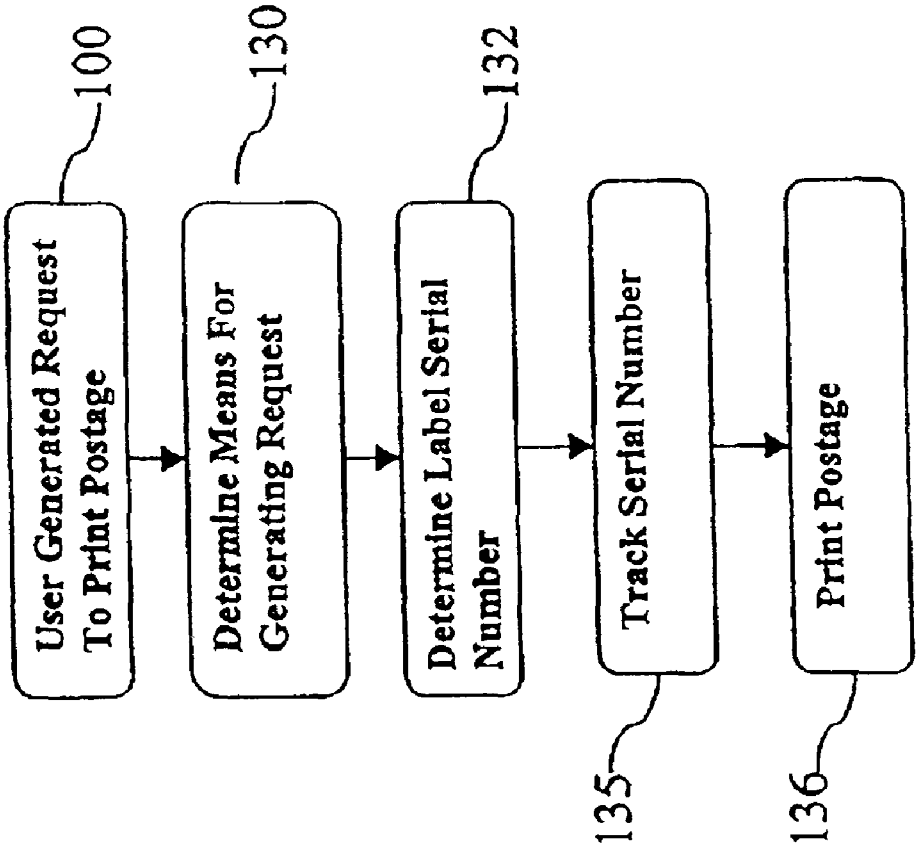
FIG. 2 is a flow chart of the operation of an exemplary system for generating computer-based postage in accordance with an exemplary embodiment of the present invention.
Figure 3:
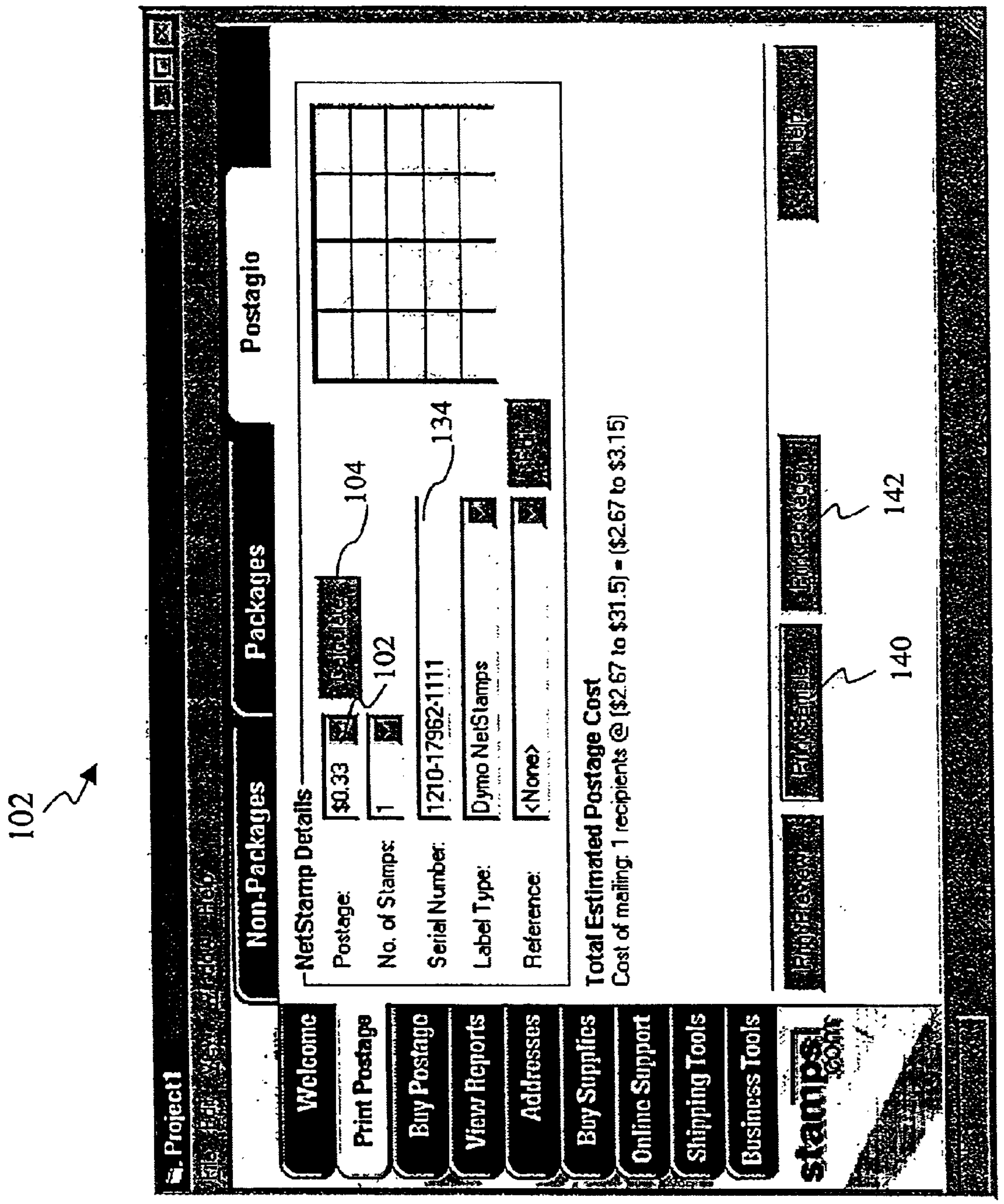
FIG. 3 is a screen shot of a suitable user interface to allow a user to enter postage information in a free format accordance with an exemplary embodiment of the present invention.

Referring now to FIG. 2, the basic operation of an exemplary computer-based postage system for printing computer-based postage stamps is described in more detail. Operation begins at step 100, with a user entering a request to print the desired postage. Conventional non PC postage stamps correspond to the postage class of the particular mailpiece, typically first class. However, there are special stamps available that are designed especially for priority and express mail services. Therefore, an exemplary computer-based postage system preferably provides a plurality of interfaces from which a user may print computer-based postage stamps for use with standard first class service as well as other speciality services. For example, as shown in FIG. 3, an exemplary user interface 102 preferably provides wizard based prompts to assist users in determining the type/class of postage to print. In addition, a second power interface is preferably available that allows customers to simply enter the postage rate and print computer-based postage stamps.

Figure 4:
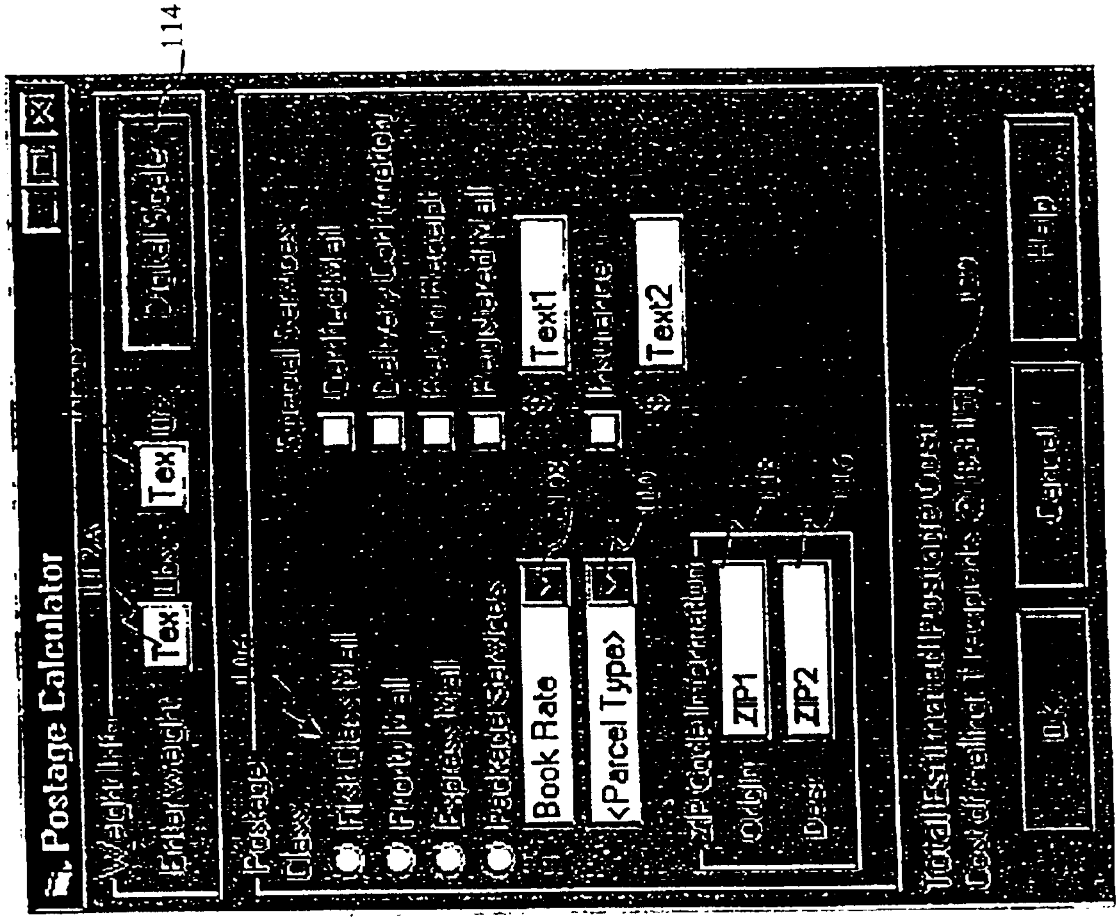
FIG. 4 is a screen shot of a postage calculator interface to allow a user to calculate the postage for a particular mail piece in accordance with an exemplary embodiment of the present invention.

An exemplary user interface preferably includes a window 104 into which the user may enter postage information, such as for example, $0.33 for first class stamps, in a free form. The user interface also includes a link 104 to a postage calculator that may be used to calculate postage for specialty services such as for example Express mail. An exemplary postage calculator as shown in FIG. 4, preferably includes a plurality of toggle buttons 106 that allow a user to select the mail class or specialty service for which postage is being printed. In addition, the calculator preferably includes a drop down box that allows a user to select a book rate 108 or the type 110 of mail piece to be sent, such as for example, a letter, flat, box or oversized box.

An exemplary postage calculator preferably allows a user to enter the weight of an item to be mailed into weight fields 112A, 112B. The dimensions of the weight fields may be for example pounds and ounces. An exemplary on-line postage system preferably allows users to integrate a digital scale into the postage system. The print postage screen preferably provides an interface to the digital scale. A scale button 114 on the print postage screen preferably allows for the automatic retrieval of the weight of the mail piece from the scale. The system preferably displays this weight in the enter weight fields 112A, 112B. A default weight is preferably 0 lbs., 1 oz. After the initial use, the fields preferably remember the last value.

An exemplary postage calculator further provides windows 116 and 118 in which a user may enter the destination and origin zip codes respectively. The destination and origin zip codes are active after a weight that warrants zone based postage has been entered. A cost of mailing dialog box 120 preferably appears when multiple recipients are selected. The cost of mailing dialog box 120 preferably displays the total cost for the mailing.

Referring back to FIG. 2, in the described exemplary embodiment, the indicia generation process preferably determines whether the print wizard was used to generate the request to print computer-based postage stamps 130. If the print wizard was used to generate the request the class selected within the wizard will be the class included in the computer-based postage stamps. If the wizard was not used, the rate class will default to first class. In an exemplary embodiment of the present invention, a user may select any denomination of postage desired, up to the maximum limit defined by the PCIBI-O, that is currently $999.99.

An exemplary system preferably utilizes special paper label stock to protect against the fraudulent production of computer-based postage stamps. The paper label stock may be available through the computer-based postage service provider, through retail outlets or other sources. In one embodiment of label stock in accordance with the present invention, multiple labels are placed on a single large sheet of label stock. The multiple labels may be arranged in any fashion. In one embodiment of a label sheet in accordance with the present invention, the labels are arranged in a rectilinear grid pattern. In another embodiment of label stock in accordance with the present invention, multiple labels are arranged in a linear fashion placed on a roll of label stock.

In accordance with an exemplary embodiment of the present invention a serial number uniquely identifies a label used to generate a postage stamp. Such a label is herein termed a Postagio label. An exemplary system may determine the label serial number 132 by way of the master serial number entered by a user in a window 134 of the indicia print interface (see FIG. 3). The master serial number is a manufacturer serial number that is used to track the production, distribution, and use of a particular unit of label stock. An exemplary system preferably prints computer-based postage stamps having a pre-printed serial number that matches a serial number on a Postagio label. As an added security measure, the pre-printed serial number on the Postagio label will be based on the master serial number for label stock. In one embodiment of a pre-printed serial number in accordance with the present invention, the master serial number is included as the leading 3 digits in a pre-printed serial number. This allows a customer to reuse a partial sheet of label stock, reducing waste while maintaining the secure nature of the paper.

An exemplary embodiment of the present invention preferably uses alphanumeric serial numbers, generated from a 28-character set. The alphanumeric serial numbers will be broken up visually for the customer to reduce data entry errors. The master serial number will contain a checksum value and will help prevent incorrect sheet values. In operation when a user prints computer-based postage stamps an exemplary system preferably prints a serial number as part of the indicia just above the pre-printed serial number already on the label. In a preferred embodiment the printed serial number is the same font and size as the pre-printed number on the label. This allows for immediate comparison of the numbers by USPS personnel.

In addition, a special serial number, such as for example, LLL.LLL.LLL.LLL will be reserved for use by QA and will not be tracked or restricted from reuse in any way. Entry of this value will bypass the checksum validation. If a user enters this serial number inadvertently, the indicium will be generated and their account will be debited. However, the printed serial number will not match the label serial number. This will require USPS intervention to recognize that the serial numbers do not match In the described exemplary embodiment, master serial numbers and pre-printed serial numbers are tracked on the server 135. When a unit of label stock has been used, the server flags the meter number that used label stock. If the user prints computer-based postage stamps on a portion of label stock, the user will be able to print indicia on the remaining labels included in the label stock at a later time. However, only the meter that initially used the label stock will be permitted to print the remaining labels. Once all labels included in the label stock have been printed, the associated master serial number and preprinted serial numbers will be flagged and any attempts to print a label using those serial numbers will be rejected by the server. A preferred embodiment will not activate all possible serial numbers. Rather, only label stock and labels having serial numbers that have been produced by a manufacturer and placed into distribution will be active and available for use.

Figure 5:
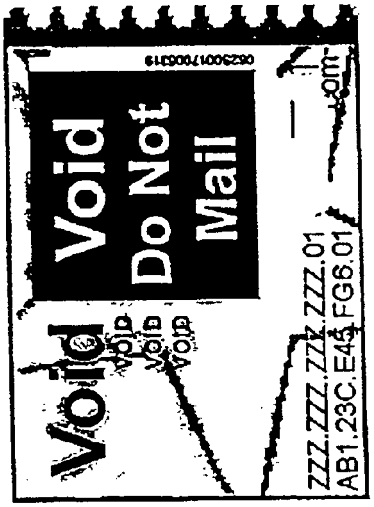
FIG. 5 is a plan view of a void Computer-based postage stamp in accordance with an exemplary embodiment of the present invention.

A user may print 136 postage or sample postage onto the label stock. Referring to FIG. 3, the user may print sample postage by selecting a print sample postage radio button 140. Therefore, an exemplary computer-based postage system preferably includes void computer-based postage stamps as sample postage for use in printer verification tests. An example of a void computer-based postage stamp is shown in FIG. 5. An exemplary postage system may utilize a serial number outside the character set reserved for actual postage, such as for example, ZZZ.ZZZ.ZZZ.ZZZ.## as the serial number for void indicia.

Referring back to FIG. 3, the user may print an actual computer-based postage stamp by selecting a print postage radio button 142. An exemplary computer-based postage stamp is preferably different from indicia currently in use for IBIP to allow USPS personnel and customers to instantly recognize and distinguish the computer-based postage stamps. However, the computer-based postage stamp preferably also guards against fraud. Therefore, an exemplary Postagio indicium preferably utilizes a data matrix barcode format.

Figure 6:
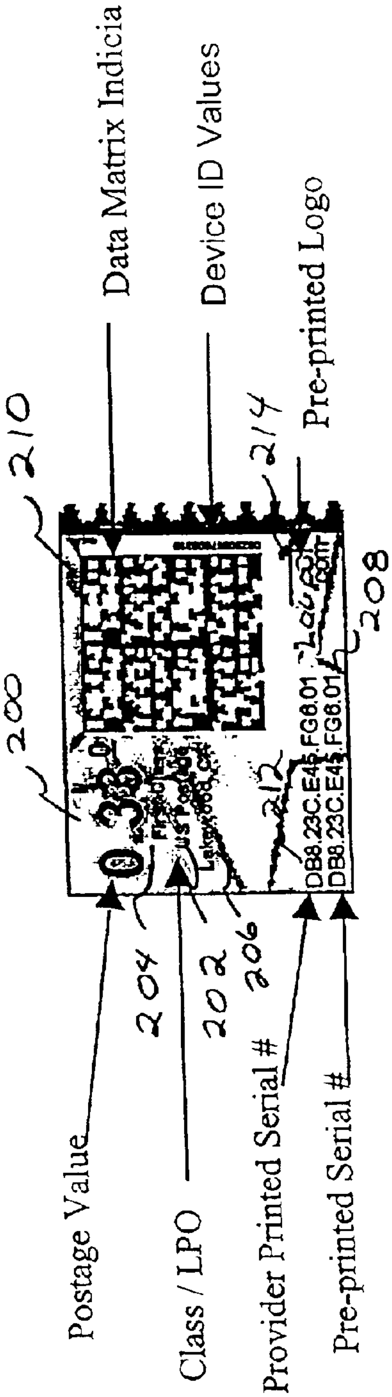
FIG. 6 is a plan view of a computer-based postage stamp in accordance with an exemplary embodiment of the present invention.

Referring to FIG. 6, an exemplary computer-based postage stamp includes multiple pieces of information, some pre-printed and some printed at the time of indicia creation, to ensure the uniqueness of the stamp and ease of processing. For example, an exemplary indicia includes the postage amount 200 displayed in the upper left-hand corner of the indicia. The postage amount is preferably displayed using the largest font size permitted given the size of the label and the indicium. The large font size helps ensure that USPS personnel can quickly identify the stamp value. In addition, an exemplary system preferably prints "US Postage" 202 under the postage amount, preferably, in a slightly smaller font than the postage amount. The term US Postage helps ensure that the stamp is identified as being domestic in origin. Further the indicia preferably identifies the mail class 204 served by the stamp and may include relevant information regarding the stamps origination such as for example the LPO 206 or Licensing Post Office.

A computer-based postage stamp may further include a pre-printed serial number 208. The pre-printed serial number is a unique number printed on the bottom left-hand corner of the label to identify the sheet source and the individual label number. An exemplary system further encodes the pre-printed serial number in the indicium 210 to ensure that the stamp is unique. In addition, a serial number will also be printed 212 at the time the Postagio is created. This will be printed directly above the pre-printed serial number as an added fraud deterrent. If the serial numbers do not match each other and the serial number in the indicium, then the computer-based postage is not valid. The computer-based postage stamp may further include the logo 214 of the computer-based postage provider. The logo may be preprinted on the label. In one embodiment the label stock preferably features the provider logo as a means to guarantee that the label stock meets the necessary security requirements.

In the described exemplary embodiment, the labels may also include various anti-fraud features to guard against the fraudulent production of computer-based postage stamps. For example, the label stock preferably uses phosphorescent ink. This type of ink is considered a specialized material that is not readily available to the general public, ensuring the security of the label stock. Therefore, in one embodiment each Postagio label is coated with a phosphorescent ink. The phosphorescence will also assist the USPS automated handling equipment in identifying the stamp. In addition, the computer-based postage stamps will preferably be cut with a special die to further ensure the security of the Postagio labels. In one embodiment of a special die in accordance with the present invention, the cutting edges of the die do not follow a straight line. Instead the cutting edges are composed of a sequence of specially angled lines.

The label stock may further include watermark printing in the form of a printed background graphic (preferably in that range of about 10–20% color saturation). The watermark printing is visible to the eye and not easily reproduced. The watermark in one embodiment is represented by a flag emblem, as shown in the sample indicia illustrated in FIG. 5.

The Postagio label stock may further include micro-printing that is invisible to the naked-eye, but can be seen under a microscope. The micro-printing provides an additional security measure, since it cannot be easily reproduced. In a preferred embodiment the micro-printing is limited to the space to the left of the indicium. The micro-printing preferably reads "US Mail/The name of the service provider".

In addition, the service provider's logo may be printed on each Postagio label. The logo helps ensure that an authorized vendor designated by both the service provider and the USPS created the label. In addition, it will help the USPS to quickly identify the product that created the Postagio. Finally as previously described a pre-printed serial number with thermally sensitive color-changing ink, known as thermochromatic ink, may be included on the Postagio label stock. The serial number uniquely identifies the Postagio label. In one embodiment, the serial number on the label must match the number printed by the service provider as well as the number in the indicium. The color-changing ink ensures that a designated vendor created the Postagio label.

The Postagio label stock preferably does not use optical brightening agents, to prevent a reaction under black light. In addition, different color paper may be offered, possibly including white, ivory, blue, pink, peach, and gray. All paper will be tested to ensure compliance with the anti-fluorescent requirements and to ensure that the indicia is still easily scanable. Colors will preferably have a maximum saturation in a range of about 10–30% saturation. In addition, the label design preferably accounts for print engine tolerance in placement of specific elements.

Figure 7:
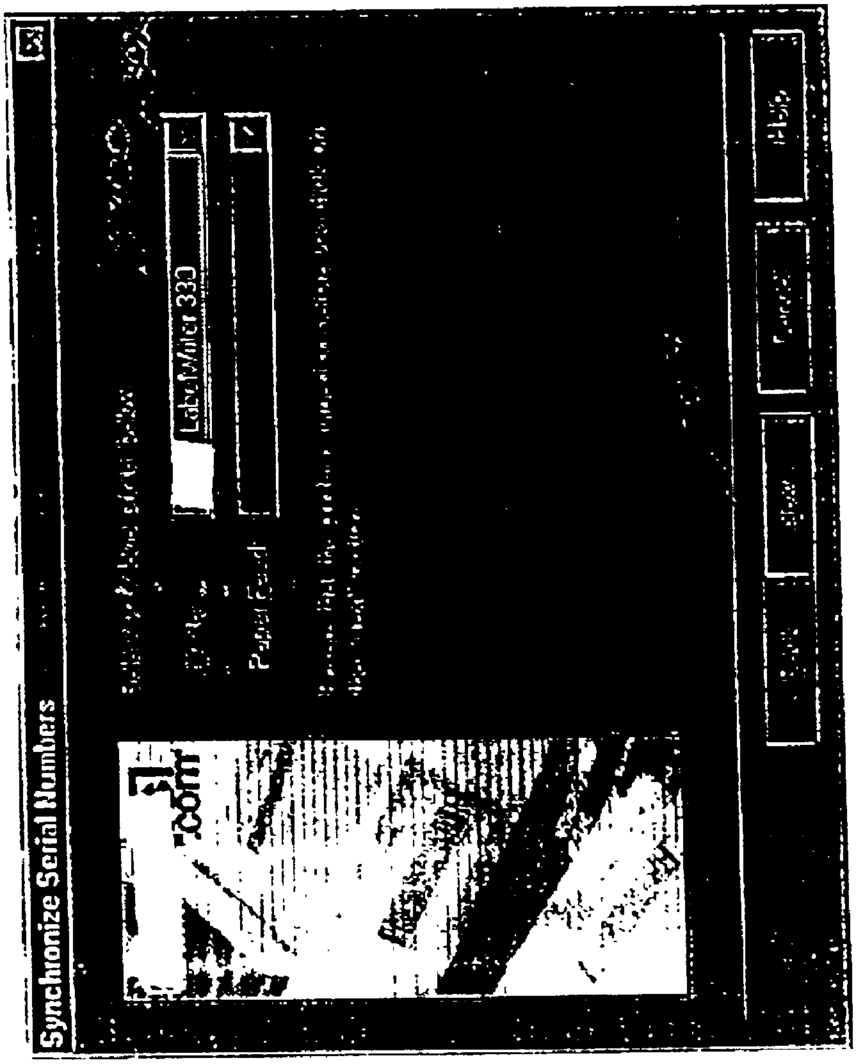
FIG. 7 is a screen shot of a suitable user interface to allow a user to enter the serial number of a label sheet or roll of labels in accordance with an exemplary embodiment of the present invention.
Figure 8:
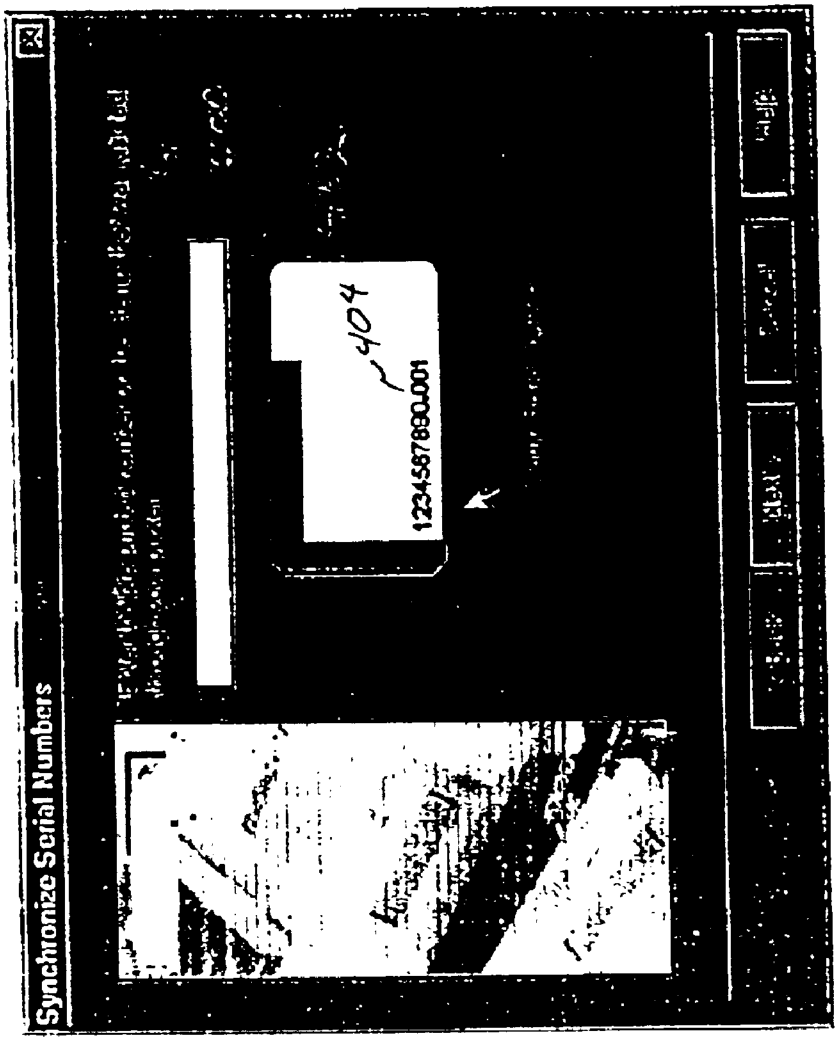
FIG. 8 is a screen shot of a suitable user interface to allow a user to enter a master serial number of sheet label stock or roll label stock in accordance with an exemplary embodiment of the present invention.

FIG. 7 and FIG. 8 are screen shots of a suitable user interface allowing a user to enter the master serial number of a sheet or roll of label stock in accordance with an exemplary system for generating computer-based postage in accordance with the present invention. FIG. 7 is a screen shot of a suitable user interface to allow a user to enter a printer type in accordance with an exemplary embodiment of the present invention. The printer type will determine whether sheet label stock or roll label stock is being used. A user uses the printer type field 300 to enter a printer used to print postage. The user uses the printer type button 302 to generate a printer type menu (not shown) with selectable names of supported printer types. In operation, the user selects the printer type button to generate the printer type menu. The user selects a printer type from the printer type menu. The printer type menu is dropped and the printer type selected by the user is shown in the printer type field. Once entered, the printer type is retained for future reference. The user selects a "next" button 304 to advance to the next serial number entry user interface screen. In the case where the user selects a printer type indicating that roll label stock is being used, a blank stamp is issued from the printer 16 (FIG. 1) when the "next" button is selected. The user may then reference the issued blank stamp for subsequent data entry tasks.

FIG. 8 is a screen shot of a suitable user interface to allow a user to enter the serial number of sheet label stock or roll label stock in accordance with an exemplary embodiment of the present invention. In the case that a printer type using roll label stock was selected by the user in the previous user interface screen, the user interface includes an instruction message 400 telling the user to examine the blank stamp that was issued from the printer 16 (FIG. 1). The blank stamp includes a pre-printed serial number from which the master serial number for the entire roll of label stock may be determined. The pre-printed serial also includes a label sequence number 404 that identifies the label's sequence in the roll of label stock. The user reads the pre-printed serial number from the stamp and enters the serial number into the serial number entry field 402. In the case where the user is using label stock in sheet form, the user simply reads a pre-printed serial number from one of the labels on the sheet label stock. The exemplary system for generating computer-based postage uses the entered serial number for subsequently printing postage as previously described. In an embodiment of an exemplary system for generating computer-based postage in accordance with the present invention, the entered serial number is validated by checking the pre-printed serial number against a database of valid pre-printed serial numbers and also by checking the type of the label stock associated with the pre-printed serial number.

Figure 9:
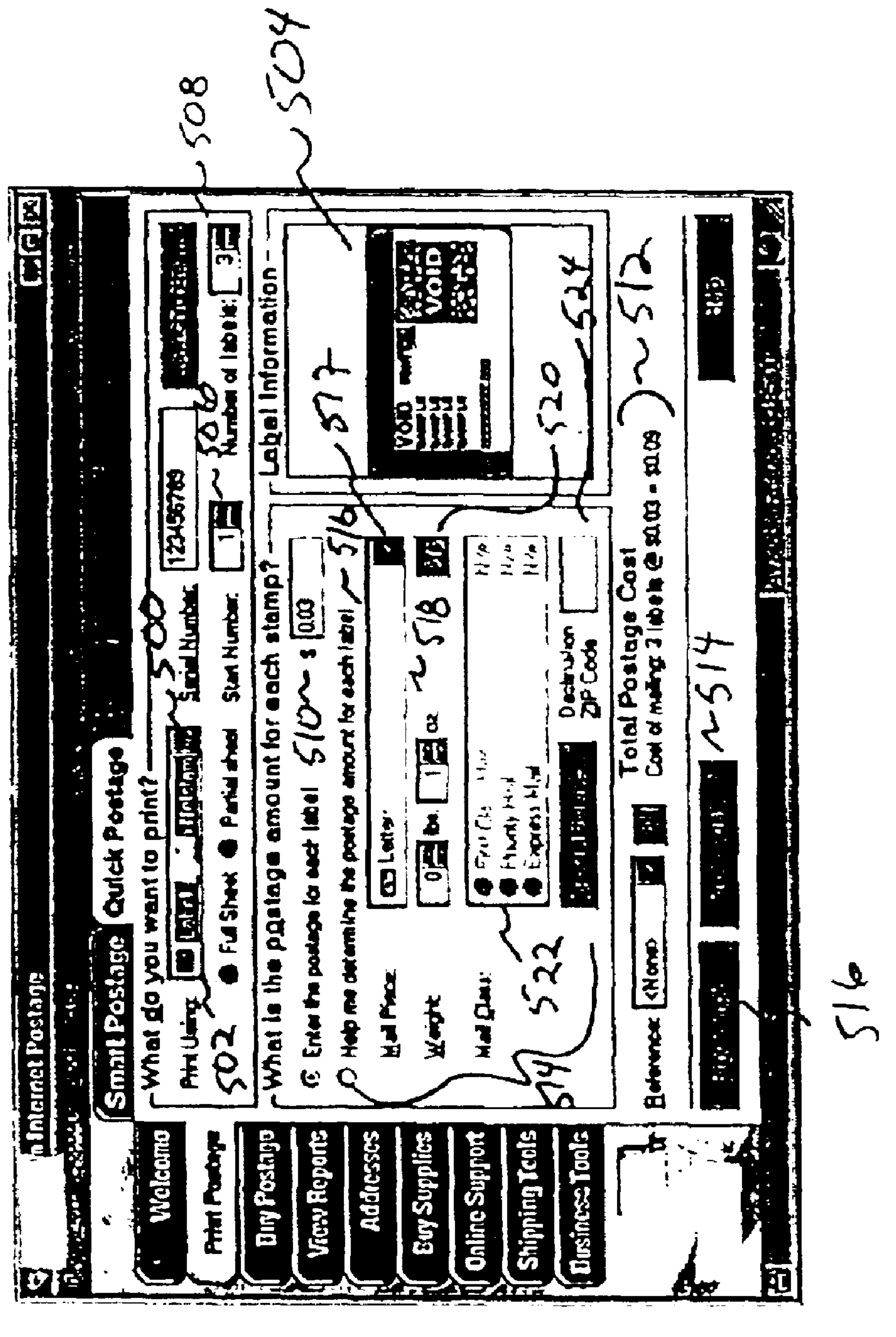
FIG. 9 is a screen shot of a suitable user interface to allow a user to quickly print postage using roll label stock in accordance with an exemplary embodiment of the present invention.

FIG. 9 is a screen shot of a suitable user interface to allow a user to quickly print postage using a roll of label stock in accordance with an exemplary embodiment of the present invention. A user selects a printer type selection button 502 to generate and display a printer type menu (not shown). The printer type menu includes a list of selectable printer types. The user selects a printer type from the menu and the printer type menu is dropped. The selected printer type determines the label stock type as shown in label stock type field 502. Additionally, an exemplary label 504 is shown within the user interface confirming the user's choice of label stock. The user enters a start number in a start number entry field 506 and the number of labels to print in a number of labels entry field 508. The user enters the amount of postage to print on each label in a postage entry field 510. The total amount of postage to be printed is calculated and displayed in a total postage cost field 512.

If the user does not know how much postage is needed, the user may use a postage calculator 514 included in the user interface to calculate the correct amount of postage. To use the postage calculator, the user selects a mail piece type using the mail piece type entry field 516. The user then enters the weight of the mail piece using weight entry field 518. In one embodiment of an exemplary system for generating computer-based postage, the user can select a scale button 520 to automatically enter the weight of a mail piece as the mail piece is weighed on a digital scale. The user selects the mail class of the mail piece using a mail class entry field 522. Finally, the user enters a ZIP code to which the mail piece is being sent in a ZIP code entry field 524. Once all of the previously described information is entered, a postage amount is calculated and displayed in the previously described total postage cost field 512.

To print postage, the user selects a print labels button 514. Alternatively, the user can print a voided sample label by selecting a print sample button 516.

Figure 10:
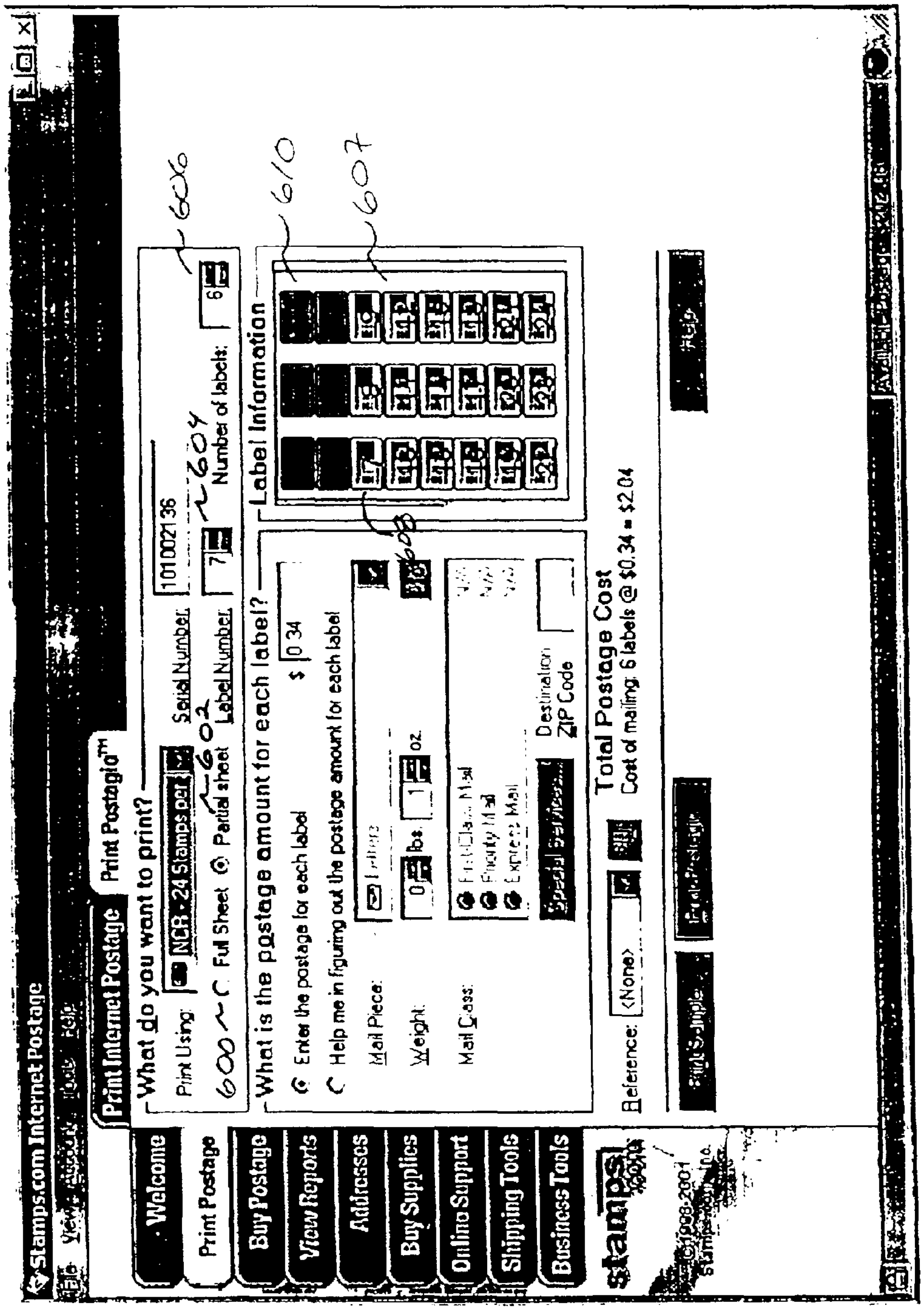
FIG. 10 is a screen shot of a suitable user interface to allow a user to quickly print postage using sheet label stock in accordance with an exemplary embodiment of the present invention.

FIG. 10 is a screen shot of a suitable user interface to allow a user to quickly print postage using a sheet of label stock in accordance with an exemplary embodiment of the present invention. The operation of this user interface is the same as the previously described roll label stock interface. However, if a user selects a printer type using sheet label stock instead of roll label stock, two additional buttons are made available to the user. A user selects a full sheet button 600 to print postage onto a full sheet of labels.

The user may also select a partial sheet button 602 to print postage on a partial sheet of labels. In this case, the user enters a starting number for the labels in a start number entry field 604 and the number of labels to print in a number of labels field 606. When the user selects the partial sheet button and enters a start number in the start number entry field, a sheet label stock display 701 is generated showing labels that will be printed. The sequence numbers 608 of the printable labels on the sheet label stock are shown in the sheet label stock display. Those labels that will not be printed are shown as blank labels 610.

Figure 11:
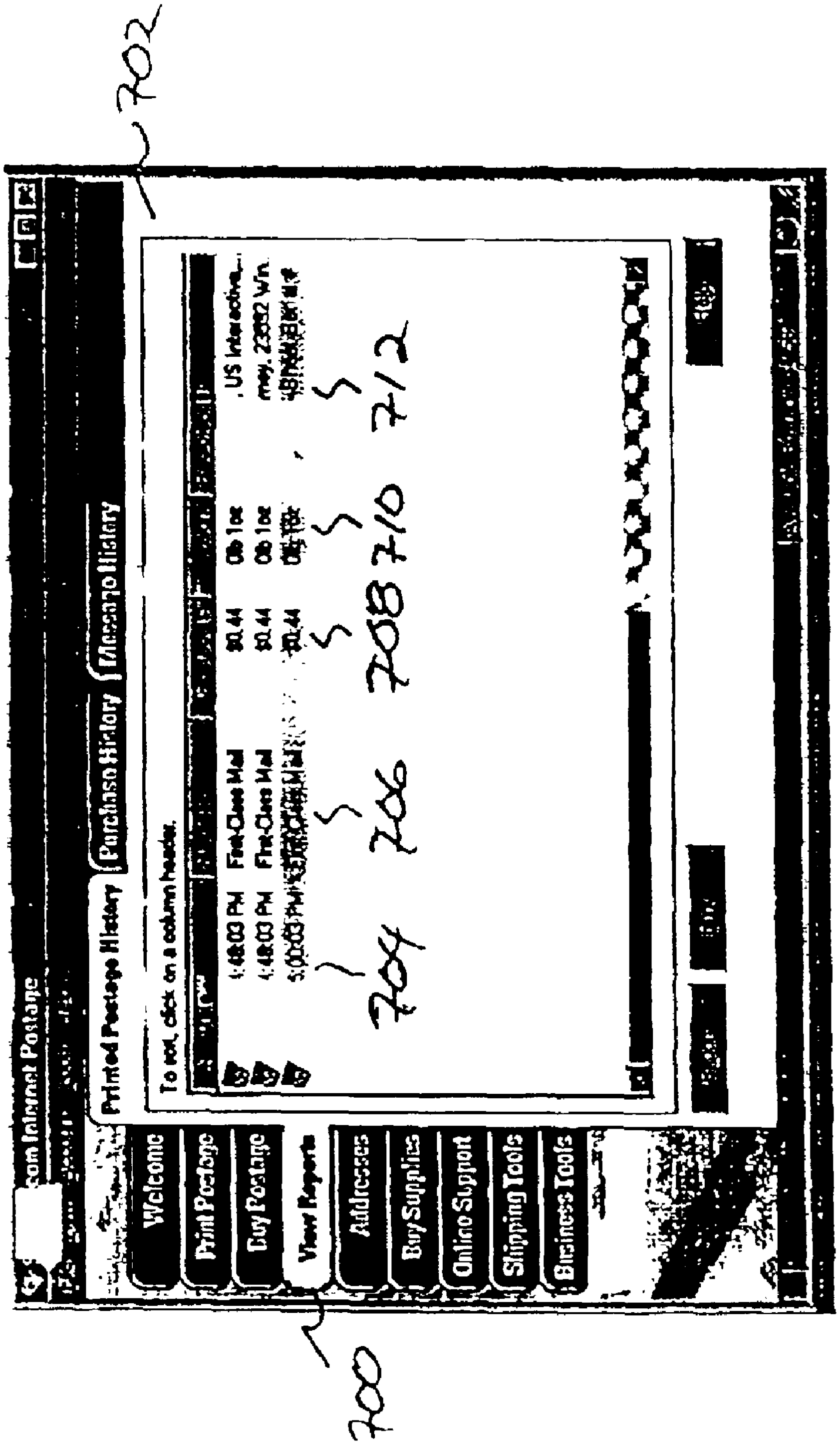
FIG. 11 is a screen shot of a suitable user interface to allow a user to view a history of printed postage in accordance with an exemplary embodiment of the present invention.

FIG. 11 is a screen shot of a suitable user interface to allow a user to view a history of printed postage in accordance with an exemplary embodiment of the present invention A user selects a view reports tab 700 to generate a printed postage history display 702. The printed postage history display includes printed postage histories displayed in interactive columns. The user selects an interactive column in order to sort the printed postage display using the values in the interactive column. The interactive columns include a date column 704, a mail class column 706, a postage amount column 708, a weight column 710, and a destination column 712. The user uses the printed postage history display to track the amount of printed postage over time.

Although a preferred embodiment of the present invention has been described, it should not be construed to limit the scope of the appended claims. For example, the present invention may be implemented by a variety of computer-based postage metering systems in accordance with a variety of print requirements promulgated by postal systems around the world. Further, although the operation of the present invention has been demonstrated in accordance with USPS requirements for PC based postal printing, the present invention is not limited to applications in accordance with the USPS requirements. Rather, the present invention is equally applicable for operation in all PC postal printing systems.

In addition, those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method for printing postage, comprising:

receiving a label stock comprising a set of labels each having a pre-printed serial number, each pre-printed serial number related to a single master serial number that identifies the label stock;

receiving a postage request;

generating an indicium in accordance with the master serial number, pre-printed serial number, and the postage request, the indicium including an indicator verifying a match with the pre-printed serial number; and printing the postage using the indicium and the label stock.

2. The method of claim 1 wherein the label stock further includes anti-fraud features.

3. The method of claim 2 wherein the anti-fraud features include micro-printing on the label stock.

4. The method of claim 2 wherein the anti-fraud features include a watermark on the label stock.

5. The method of claim 2 wherein the anti-fraud features include cutting the label stock using a special die.

6. The method of claim 2 wherein the anti-fraud features include printing using color changing ink on the label stock.

7. The method of claim 1 wherein the postage request includes a postage amount.

8. The method of claim 1 wherein the postage request includes a postage class.

9. The method of claim 1 wherein the postage request includes a Licensing Postage Office.

10. The method of claim 1 further comprising including the pre-printed serial number in the indicium.

11. The method of claim 1, wherein the indicator is a serial number matching the pre-printed serial number.

12. The method of claim 1 wherein the master serial number is linked to a first postage printing device and generating the indicium further includes ensuring the master serial number is used with the first postage printing device.

13. The method of claim 12, further comprising:

rejecting a request to print an indicium related to the master serial number on a second postage printing device.

14. The method of claim 1, further comprising checking if the master serial number is an active master serial number.

15. The method of claim 1 further comprising tracking the use of a label stock serial number.

16. A data processing system adapted to print postage, comprising:

a processor; and a memory operably coupled to the processor and having program instructions stored therein, the processor being operable to execute the program instructions, the program instructions including:

receiving a label stock pre-printed serial number, the pre-printed serial number including a master serial number; receiving a postage request;

generating an indicium in accordance with the master serial number, pre-printed serial number, and the postage request, the indicium providing a visual verification of a match with the pre-printed serial number; and printing the postage using the indicium and the label stock.

17. The data processing system of claim 16 wherein the label stock further includes anti-fraud features.

18. The data processing system of claim 17 wherein the anti-fraud features include micro-printing on the label stock.

19. The data processing system of claim 17 wherein the anti-fraud features include a watermark on the label stock.

20. The data processing system of claim 17 wherein the anti-fraud features include cutting the label stock using a special die.

21. The data processing system of claim 17 wherein the anti-fraud features include printing using color changing ink on the label stock.

22. The data processing system of claim 16 wherein the postage request includes a postage amount.

23. The data processing system of claim 16 wherein the postage request includes a postage class.

24. The data processing system of claim 16 wherein the postage request includes a Licensing Postage Office.

25. The data processing system of claim 16, the program instructions for generating the indicium further including the pre-printed serial number in the indicium.

26. The data processing system of claim 16 wherein the program instructions further include linking the master serial number to a specific postage printing device and the program instructions for generating the indicium further include ensuring the master serial number is used with the specific postage printing device.

27. The data processing system of claim 16 wherein the program instructions further include tracking the use of a label stock serial number.

28. A method for printing postage, comprising:

receiving a label stock with at least one pre-printed serial number on a label, the pre-printed serial number related to a master serial number of the label stock, the label stock including printing in color-changing ink, labels cut with a special die, micro-printing, and a watermark;

receiving a postage request;

generating an indicium in accordance with the master serial number, pre-printed serial number, and the postage request, the indicium providing means for verifying the validity of the postage; and printing the postage using the indicium and the label stock.

29. The method of claim 28, further comprising tracking the use of a label stock serial number.

30. The method of claim 28 wherein the master serial number is linked to a specific postage printing device and generating the indicium further includes ensuring the master serial number is used with the specific postage printing device.

31. The method of claim 28 wherein the postage request includes a postage amount.

32. The method of claim 28 wherein the postage request includes a postage class.

33. The method of claim 28 wherein the postage request includes a Licensing Postage Office.

34. The method of claim 28 further comprising including the pre-printed serial number in the indicium.

35. A method for printing postage, comprising:

receiving a label stock comprising a first label with a pre-printed serial number;

receiving a postage request;

generating an indicium in accordance with the pre-printed serial number and the postage request;

printing the postage using the indicium and the first label, the indicium providing means for verifying the validity of the postage;

tracking the use of the pre-printed serial number; and rejecting a subsequent postage request for a second label with the pre-printed serial number.

36. The method of claim 35 wherein the postage request includes a postage amount.

37. The method of claim 35 wherein the postage request includes a postage class.

38. The method of claim 35 wherein the postage request includes a Licensing Postage Office.

39. The method of claim 35 further comprising including the pre-printed serial number in the indicium.

40. The method of claim 35 wherein the label stock further includes anti-fraud features.

41. A method for printing postage, comprising:

receiving a label stock with a pre-printed serial number, the label stock cut with a special die and including printing in color-changing ink;

receiving a postage request;

generating an indicium in accordance with the pre-printed serial number and the postage request, the indicium providing means for verifying the validity of the postage by a known correspondence to the pre-printed serial number; and printing the postage using the indicium and the label stock.

42. The method of claim 41, further comprising tracking the use of the pre-printed serial number.

43. A method for printing postage, comprising:

receiving a pre-printed serial number for label stock cut with a special die;

receiving a postage request;

generating an indicium in accordance with the pre-printed serial number and the postage request;

printing the postage using the indicium and the label stock;

tracking the use of the pre-printed serial number; and blocking subsequent use of the pre-printed serial number.

44. A method for generating a display in a user interface for printing postage, comprising:

receiving a label stock type for a label stock, the label stock including a plurality of sequenced labels;

receiving a label starting sequence number for a label from the plurality of sequenced labels; and generating a label stock display using the label stock type and label starting sequence number, the label stock display providing means for verifying the validity of the postage in relation to the label starting sequence number.

* * * * *